(12) United States Patent
Kitahara et al.

(10) Patent No.: US 7,630,094 B2
(45) Date of Patent: Dec. 8, 2009

(54) IMAGE PRINT APPARATUS, DIRECT PRINT SYSTEM AND PRINT SETTING METHOD

(75) Inventors: Yoshinao Kitahara, Nagano (JP); Hideki Morozumi, Nagano (JP); Kenji Sakuda, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 822 days.

(21) Appl. No.: 11/208,650

(22) Filed: Aug. 23, 2005

(65) Prior Publication Data

US 2006/0044602 A1    Mar. 2, 2006

(30) Foreign Application Priority Data

Aug. 23, 2004  (JP)  ............ P2004-241934

(51) Int. Cl.
*G06F 3/12* (2006.01)
*G06K 15/00* (2006.01)

(52) U.S. Cl. .................... 358/1.15; 358/1.13
(58) Field of Classification Search .......... 358/1.1, 358/1.9, 1.11–1.18; 399/14, 45, 81–82; 715/210, 715/269

See application file for complete search history.

(56) References Cited

U.S. PATENT DOCUMENTS

| | | | | |
|---|---|---|---|---|
| 5,229,814 A | * | 7/1993 | Hube et al. | 399/14 |
| 6,775,488 B2 | * | 8/2004 | Sawada | 399/45 |
| 7,148,977 B2 | * | 12/2006 | Zerza et al. | 358/1.14 |

FOREIGN PATENT DOCUMENTS

WO    WO 2004/021164 A1    3/2004

* cited by examiner

*Primary Examiner*—Dov Popovici
*Assistant Examiner*—Thierry L Pham
(74) *Attorney, Agent, or Firm*—Sughrue Mion, PLLC

(57) ABSTRACT

An image print apparatus includes: a receiver that receives a plurality of set values for printing an image on a paper; a deciding unit that decides whether or not the image print apparatus can print the image on the paper according to a combination of the received plurality of set values; a correction unit that replaces, in a case the deciding unit decides that the image print apparatus cannot print the image on the paper according to a combination of the received plurality of set values, at least one of the plurality of set values with another set value to provide a combination of the plurality of set values according to which the image print apparatus can print; and a print unit that prints the image on the paper according to the plurality of set values generated by the correction unit.

8 Claims, 6 Drawing Sheets

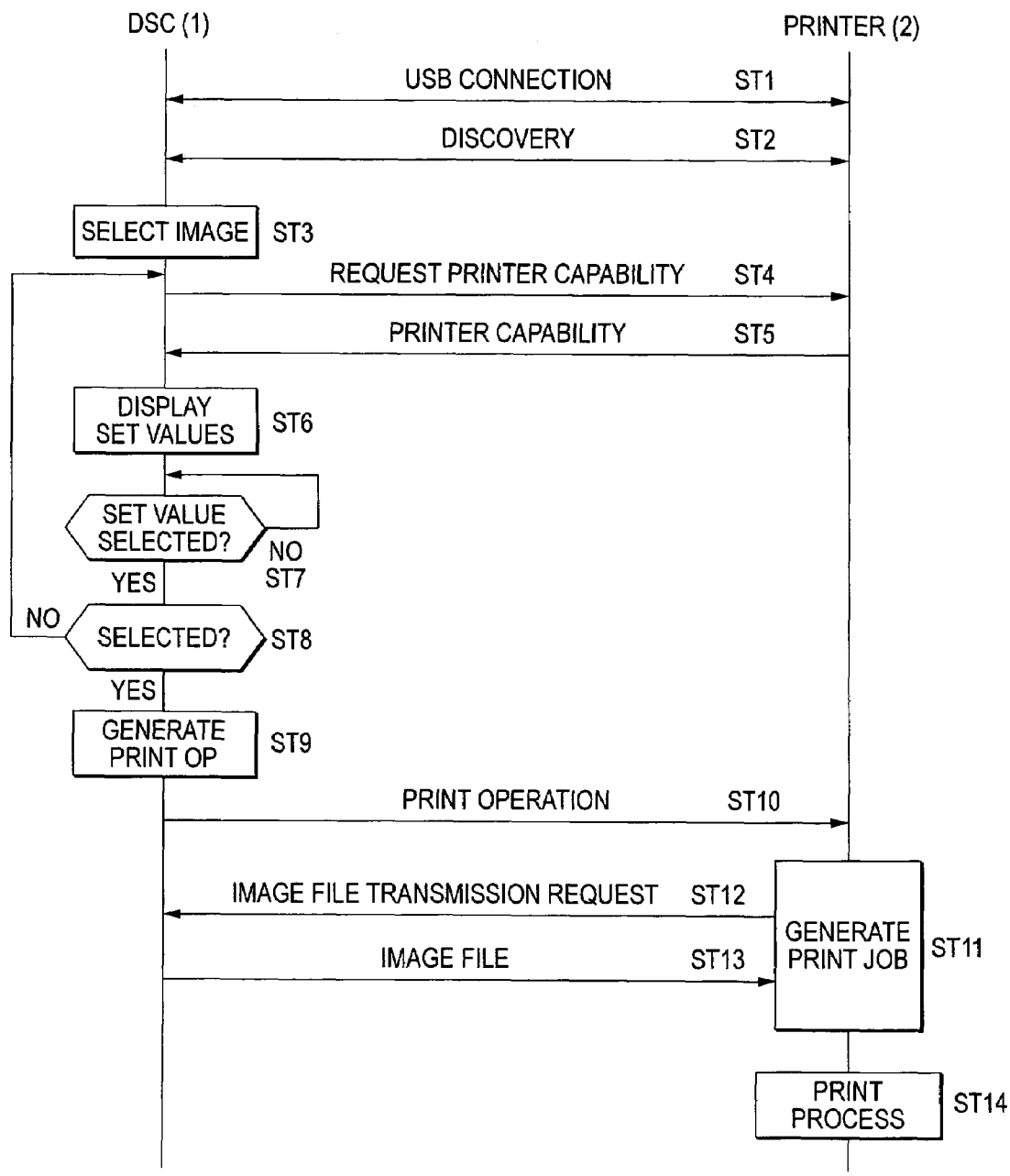

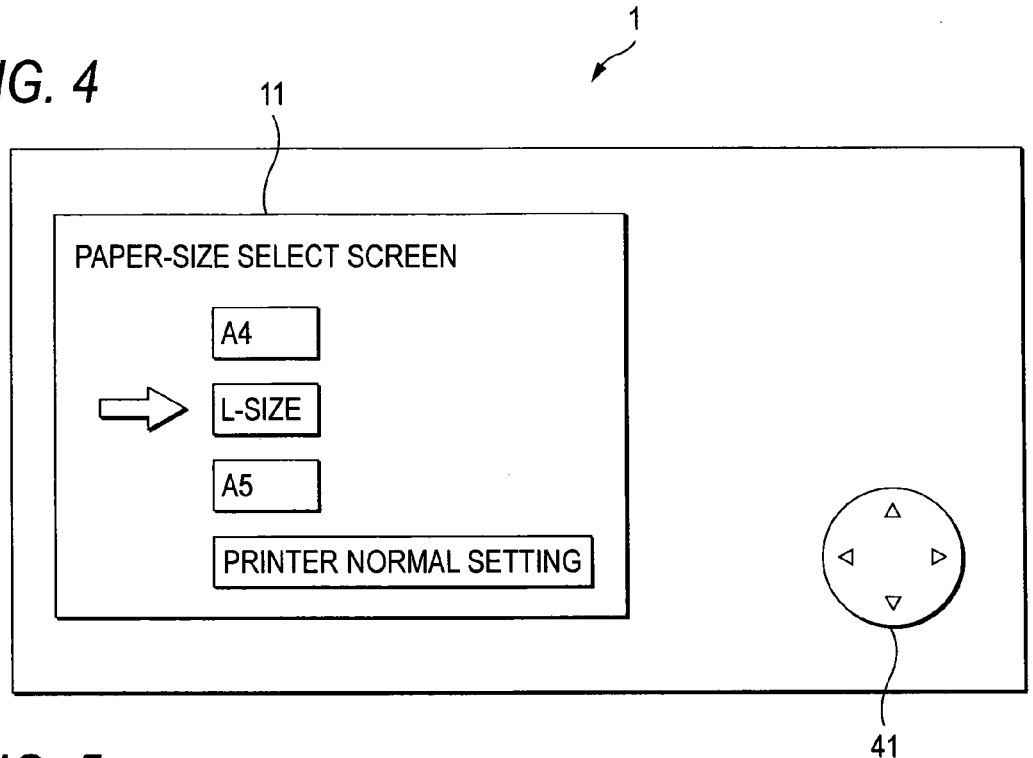

FIG. 7A

DSC'S PRINT-SETTING INSTRUCTION

```
PAPER SIZE = L-SIZE
PAPER TYPE = AS PER PRINTER SETTING
LAYOUT = SINGLE SIDE WITH NO FRAME
```

FIG. 7B

PRINTER SETTING

```
PAPER SIZE = A4
PAPER TYPE = PLAIN PAPER
LAYOUT = SINGLE SIDE WITH NO FRAME
```

FIG. 7C

PRINT SETTING USING PRINTER SETTING

```
PAPER SIZE = L-SIZE
PAPER TYPE = PLAIN PAPER
LAYOUT = SINGLE SIDE WITH NO FRAME
```
→ PRINTER 2 CANNOT PRINT

FIG. 7D

ROUND-OFF PRINT SETTING

```
PAPER SIZE = L-SIZE
PAPER TYPE = PHOTOGRAPHIC PAPER
LAYOUT = SINGLE SIDE WITH NO FRAME
```
→ PRINTER 2 CAN PRINT

IMAGE PRINT APPARATUS, DIRECT PRINT SYSTEM AND PRINT SETTING METHOD

BACKGROUND OF THE INVENTION

The present invention relates to an image print apparatus, direct print system and print setting method.

WO2004/021164 discloses a configuration that a computer and a printer are connected together by a USB cable. The computer outputs print conditions for printing a selected image by form print data selected out of plural sets of form print data. Under the print conditions, designation is possible as to paper size, paper type and so on. Meanwhile, the computer takes control of the range of form print data selectable in accordance with the printer's print capability previously acquired. This can prevent the designation of print conditions which are not allowed for printing of the printer.

As described above, in the related print system disclosed in WO2004/021164, the range of computer-selectable form print data is controlled in accordance with the printer's print capability previously acquired, thereby enabling to prevent the designation of print conditions which are not allowed for printing of the printer.

Besides those having a computer and a printer connected by a USB cable, there exists a system that a DSC (digital still camera) and a printer are connected directly by a USB cable so that the printer can print an image selected by the DSC. Such a system is called a direct print system.

Even on the direct print system, the DSC should designate a print setting to the printer in order for the printer to print an image the DSC selected. However, the DSC does not possess sufficient resources as the computer has. The DSC is lower in computer processing capability as compared to the computer. Moreover, it does not have a sufficient storage area. Meanwhile, the DSC merely has a small-sized liquid-crystal monitor and a less number of input devices. Accordingly, there is a difficulty for the DSC in storing a plurality of ones of form print data and taking control of a range of form print data selectable in accordance with printer's print capability, differently from the computer in Patent Document 1.

Consequently, it can be considered in the direct print system that settable values as to set items are transmitted from the printer to the DSC thus prompting to select a set value therefrom so that the DSC can generate a print-setting instruction which is allowed for printing of the printer whereby the printer is allowed to print the DSC-selected image according to the print settings generated.

However, even in case a print-setting instruction is generated by thus sending settable values from the printer to the DSC and prompting to select a set value therefrom, there are cases the printer is not allowed to print on a certain combination of set values in plurality. For example, on a printer compatible with paper sizes of L-size and A4-size but adapted for printing on the L-size paper only at a photographic-image quality, when a print-setting instruction with designations of L-size and plain paper is generated at the DSC, the printer is not allowed to perform a printing according to the print-setting instruction.

SUMMARY OF THE INVENTION

It is an object of the present invention to provide an image print apparatus, direct print system and print setting method that, even in case, during printing an image, a combination of a plurality of set values as to the printing is a combination of set values not allowing for printing of an image print apparatus, printing is available for an image as to the print instruction.

In order to solve the aforesaid object, the invention is characterized by having the following arrangement.

(1) An image print apparatus comprising:
  a receiver that receives a plurality of set values for printing an image on a paper;
  a deciding unit that decides whether or not the image print apparatus can print the image on the paper according to a combination of the received plurality of set values;
  a correction unit that replaces, in a case the deciding unit decides that the image print apparatus cannot print the image on the paper according to a combination of the received plurality of set values, at least one of the plurality of set values with another set value to provide a combination of the plurality of set values according to which the image print apparatus can print; and
  a print unit that prints the image on the paper according to the plurality of set values generated by the correction unit.

(2) The image print apparatus according to (1), further comprising:
  storage that stores a combination of a plurality of set values according to which the image print apparatus can print;
  setting storage that stores the set values currently set in the image print apparatus; and
  a generator that replaces, when the plurality of set values received by the receiver include a set value meant to obey a predetermined setting of the image print apparatus, the set value meant to obey the predetermined setting of the image print apparatus with the set value stored in the setting storage, and generates a print setting having the plurality of set values,
  wherein the deciding unit decides whether or not the image print apparatus can print the image according to a combination of the plurality of set values generated by the generator by referring to the combination in the storage.

(3) The image print apparatus according to (1), further comprising:
  storage which stores a combination a plurality of set values according to which the image print apparatus can print;
  setting storage which stores the set values currently set in the image print apparatus; and
  a generator that adds, when a number of the plurality of set values received by the receiver are smaller than that of a plurality of set values required in printing by the image print apparatus, the set value stored in the setting storage to the plurality of set values received by the receiver, and generates a print setting having the plurality of set values required for the image print apparatus to print,
  wherein the deciding unit decides whether or not the image print apparatus can print the image according to a combination of the plurality of set values generated by the generator by referring to the combination stored in the storage.

(4) The image print apparatus according to (1) wherein the plurality of set values received by the receiver are a print setting for printing an image to a paper or a print-setting instruction for instructing the printing.

(5) The image print apparatus according to (4), wherein the receiver is connected to an image supply apparatus to receive the print-setting instruction together with a designation of an image selected for printing by the image supply apparatus.

(6) The image print apparatus according to (1), wherein the correction unit replaces the plurality of set values into a combination of a plurality of set values which is most general set values in a direct print system.

(7) The image print apparatus according to (1), wherein
the deciding unit make a decision as to the plurality of set values of including at least paper size, paper type and print layout,
the correction unit decides a necessity of replacing the respective set values in an order of paper size, paper type and print layout, and replaces a set value required for replacement.

(8) An image print apparatus according to (1), wherein
the correction unit decides a necessity of replacing the set values of paper size, paper type and print layout, and replaces the set value required for replacement, and thereafter replaces a set value as to image quality and/or image correction.

(9) The image print apparatus according to (1) further comprising storage that stores a combination of a plurality of set values according to which the image print apparatus can print,
wherein the deciding unit decides whether or not the image print apparatus can print the image on the paper according to a combination of the received plurality of set values by referring to the combination stored in the storage.

(10) A direct print system comprising:
an image supply apparatus for sending a print-setting instruction together with a designation of a selected image to the image print apparatus;
an image print apparatus according to any one of (1) to (9) which receives the print-setting instruction including a plurality of set values, and prints the image based on the plurality of set values of the received print-setting instruction in a case the image print apparatus can print the image according to a combination of the plurality of set values of the print-setting instruction.

(11) A method of making a print setting of an image print apparatus, the method comprising:
receiving a plurality of set values for printing an image on a paper;
deciding whether or not the image print apparatus can print the image on the paper according to a combination of the received plurality of set values; and
replacing, in a case the deciding unit decides that the image print apparatus cannot print the image on the paper according to a combination of the received plurality of set values, at least one of the plurality of set values with another set value to provide a combination a plurality of set values according to which the image print apparatus can print.

According to the invention, the image print apparatus, even in case a combination of a plurality of set values concerning image printing is a combination of set values not allowing for printing by the image print apparatus, can print an image as to the print instruction onto a paper.

According to the invention, the image print apparatus, even in case a combination of a plurality of set values based on a print-setting instruction received by the receiver is a combination of set values not allowing for printing by the image print apparatus, can print an image as to the print instruction onto a paper. Furthermore, because of using to a possible extent the other set values than those obeying a predetermined setting of the image print apparatus, user's intention (choice by the user) is reflected in a range printing is allowed.

According to the invention, the image print apparatus, even in case a combination of a plurality of set values based on a print-setting instruction received by the receiver is a combination of set values not allowing for printing by the image print apparatus, can print an image as to the print instruction onto a paper. Furthermore, because of using to a possible extent the other set values than those obeying a predetermined setting of the image print apparatus, user's intention (choice by the user) is reflected in a range printing is allowed.

According to the invention, the image print apparatus can print on a paper an image selected for printing at the image supply apparatus.

According to the invention, the image print apparatus can generate a combination of a plurality of set values allowing for printing at the image print apparatus and wherein the plurality of set values for print setting are a combination of a plurality of set values broadest in application in the direct print system. Moreover, because the set value not to be replaced uses a set value established at the image supply apparatus, it is possible to print an image concerning the print instruction onto a paper while giving a serious consideration to the intent the user established for printing at the image supply apparatus.

According to the invention, the image print apparatus is to use a paper size and paper type the user established for printing on the image supply apparatus more preferentially than a print layout, and a paper size more preferentially than a paper type. Due to this, the image print apparatus is allowed to male a printing approximated to the setting the user intended during print setting.

According to the invention, the paper size, paper type and print layout the user established for printing at the image supply apparatus is to be used more preferentially than other set values. This can make a print approximate to the intention of the user of upon print setting. Moreover, when replacing other set values, the other set values can be replaced into different values in accordance with a combination of paper size, paper type and print layout because paper size, paper type and print layout are already established. As a result, the image print apparatus can make an optimal printing while making use of the setting the user has intended during print setting.

According to the invention, the image print apparatus can print an image selected at the image supply apparatus regardless of whether or not a plurality of set values of a print-setting instruction for the image allow for printing at the image print apparatus.

According to the invention, the image print apparatus, even in case a combination of a plurality of set values concerning image printing is a combination of set values not allowing for printing by the image print apparatus, can print onto a paper an image concerning the print instruction.

BRIEF DESCRIPTION OF THE DRAWINGS

FIG. 3 is a flowchart showing the overall flow of direct printing.

FIG. 4 is a backside view showing a backside of a DSC in FIG. 1.

FIG. 5 is a figure showing an example of print operation.

FIG. 7 is an explanatory figure of an example of set value combining process by the print-job generating section in FIG. 2.

DETAILED DESCRIPTION OF PREFERRED EMBODIMENTS

An image print apparatus, direct print system and print setting method according to an embodiment of the present invention will be described with reference to the drawings. The image print apparatus is described with an exemplification of a printer. The direct print system has an image supply apparatus to be explained by an exemplification of a DSC. The print setting method is explained as a part of printer operation.

Figure 1:
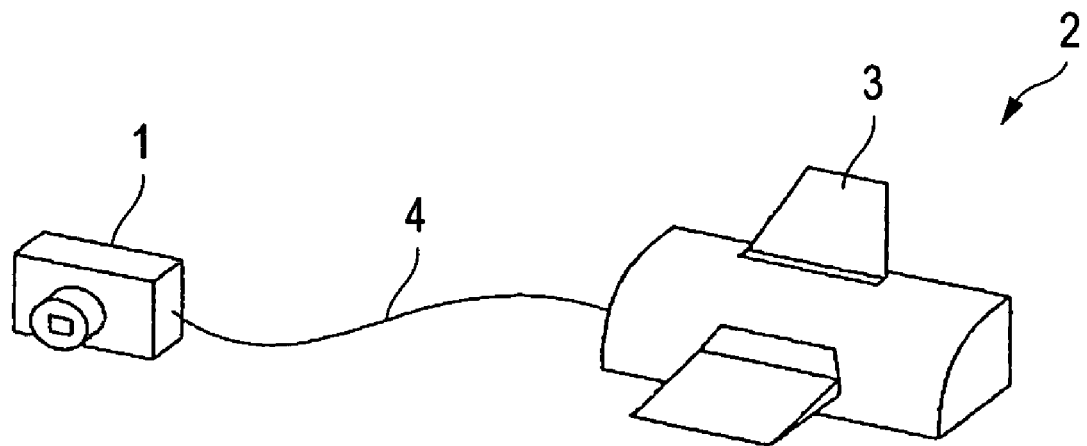
FIG. 1 is a perspective view of a direct print system according to an embodiment of the present invention.

FIG. 1 is a system perspective view showing a direct print system according to the embodiment of the invention. The direct print system comprises a DSC 1 as an image supply apparatus and a printer 2 as an image print apparatus. The direct print system is to print an image selected at the DSC 1, on the printer 2 according to a print-setting instruction made at the DSC 1.

The printer 2 in FIG. 1 is to apply ink to a paper rested on a paper tray 3 according to an inkjet method, and thereby form a full-color image on the paper. The printer 2 of the inkjet method is smaller in size as compared to the laser printer and moreover capable of printing a full-color image at low price.

The DSC 1 and the printer 2 are to be directly connected by a USB (Universal Serial Bus) cable 4. Incidentally, the DSC 1 and the printer 2 may be connected by a wired communication path, e.g. an Ethernet cable (registered trademark). The DSC 1 and the printer 2 may be configured for direct communication through a wireless communication path, e.g. Bluetooth.

Figure 2:
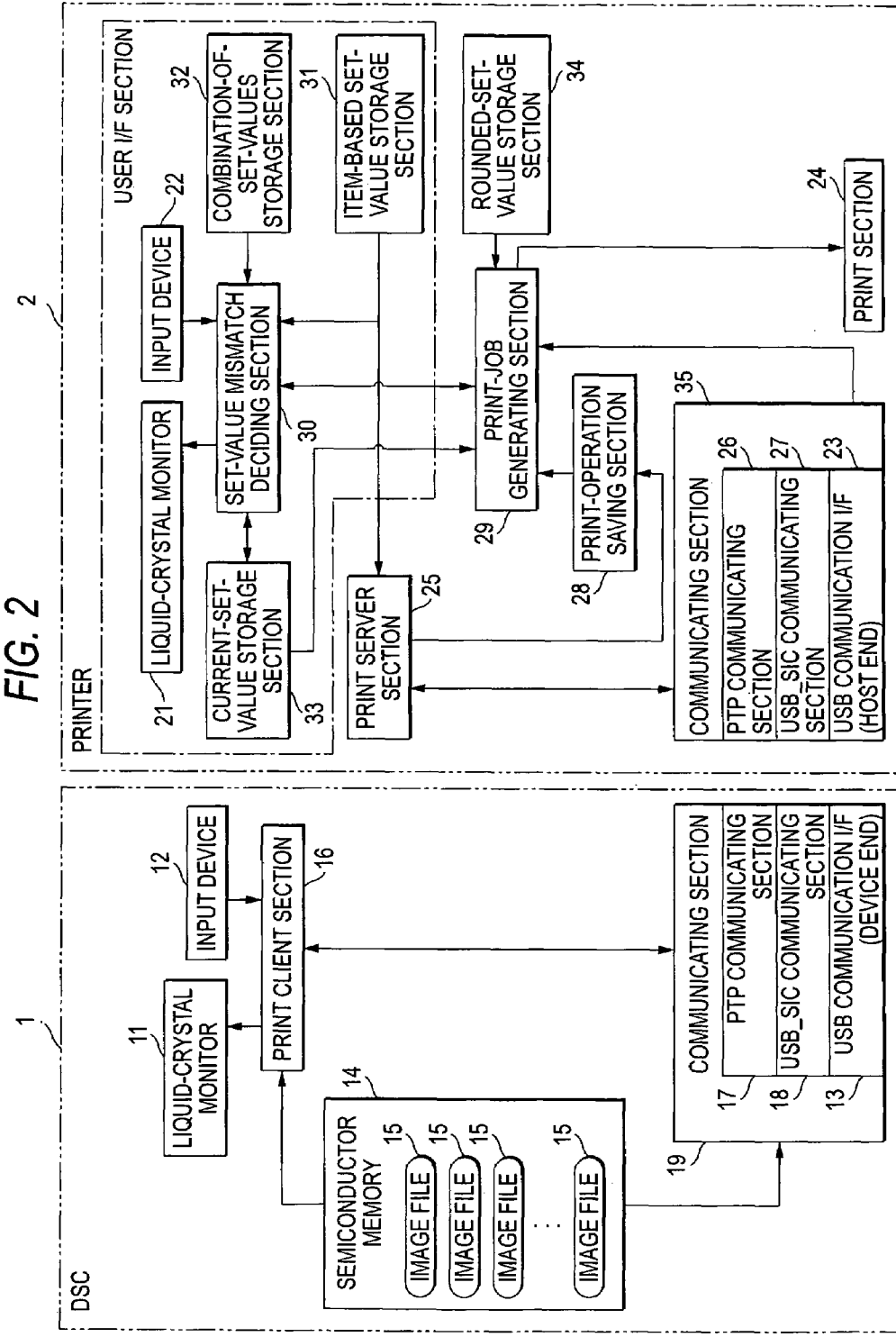
FIG. 2 is a functional block diagram of the direct print system of FIG. 1.

FIG. 2 is a block diagram showing a function to be realized on the direct print system of FIG. 1.

The DSC 1 includes a liquid-crystal monitor 11 capable of displaying an image in full color, an input device 12 for outputting an input instruction according to an operation, and a USB communicating IF (interface) 13 to which the USB cable 4 is to be connected. A semiconductor memory 14 can be inserted to and removed from the DSC 1. The semiconductor memory 14 inserted in the DSC 1 is to store a plurality of image files is taken picture of by the DSC 1.

In the DSC 1, by executing the program stored in a not-shown incorporated memory by a not-shown built-in computer, a print client section 16, a PTP (Picture Transfer Protocol) communicating section 17 and a USB-still-image-class (USB_SIC) communicating section 18 are realized. Incidentally, the program stored in the memory is a computer-readable program. It may be stored in the memory upon shipment of the DSC 1 or stored in the memory through a not-shown recording medium or transmission medium after shipment of the DSC 1.

A communicating section 19 of DSC 1 is constituted by the USB communicating IF 13, the USB_SIC communicating section 18 and the PTP communicating section 17. The communicating section 19 is to exchange data with a communicating section 35, referred later, of printer 2 connected by the USB cable 4. The data to be exchanged between the communicating sections 19, 35 includes those of data as to print operation and image files 15, referred later.

Incidentally, the USB communication I/F 13 of DSC 1, if the USB cable 4 is connected, is to function as a USB device and establish a connection for data communication with the USB host. The USB_SIC communicating section 18 of DSC 1 is to generate an end point for USB still image class by communication with the USB-SIC communicating section on the USB host side. The PTP communicating section 17 of DSC 1 is to communicate a PTP command and file with the PTP communicating section on the USB host side by use of the foregoing end point.

The print client section 16 is to select an image of the image file 15 stored in the semiconductor memory 14 and executes a generation process of print-setting instruction for causing the printer 2 to print the selected image, to thereby send a print operation including the print-setting instruction to the printer 2.

The printer 2 has a liquid-crystal monitor 21 capable of displaying a simple character, an input device 22 for outputting an input instruction according to an operation, a USB communication I/F (interface) 23 as a receiver to which the USB cable 4 is connected, and a print section 24 as a printing device for printing to a paper according to a print job.

In the printer 2, by executing a program stored in a not-shown incorporated memory by a not-shown built-in computer, realized are a print server section 25, a PTP communicating section 26, a USB_SIC communicating section 27, a print-operation saving section 28, a print-job generating section 29 as generating means and modification means, and a set-value mismatch deciding section 30 as a deciding unit. Incidentally, the program stored in the memory is a computer-readable program. It may be stored in the memory upon shipment of the DSC 1 or stored in the memory through a not-shown recording medium or transmission medium after shipment of the DSC 1.

Meanwhile, the built-in memory, not shown, of the printer 2 is provided with an item-based-set-value storage section 31, a combination-of-set-values storage section 32 as storage, a current-set-value storage section 33 as setting storage, and a rounded-set-value storage section 34.

The item-based-set-value storage section 31 is to store set values with which the printer 2 can make a printing for each set item. The set items include, for example, size and kind of a paper to be printed, print layout of an image for print, and correction process of print image quality and images. Paper-size set value includes, for example, A4, B5, A5, 2L size, L size, postcard, and name card, for example. Paper-type set value includes, for example, plain paper, postcard paper, luster paper, inkjet paper, photographic paper and high image-quality paper. Image-print-layout set value includes, for example, 1-up (one image), 2-up (two images), 4-up (four images), thumbnail (e.g. 16 images), and with or without frames. Image-print-quality set value includes, for example, ordinary and high quality. Image-correction-process set value includes, for example, with correction and without correction.

The combination-of-set-values storage section 32 is to store a combination of set values with which the printer 2 can make a printing. Incidentally, the combination-of-set-values storage section 32 may store a combination of set values with which the printer 2 which is not allowed to make a printing. The set-value combination with which the printer can make a printing, and which is stored in the combination-of-set-values storage section 32 may be represented by, for example, "A4-plain paper-1-up without a frame-high image quality-without correction". This example of set-value combination is meant to make a quality printing of one image having no frames onto an A4-size plain paper without applying an image correction. Besides, in the case the combination-of-set-values storage section 32 stores, for example, "L-size plain paper" as a set-value combination which is not allowed for printing on the printer 2, it means that the printer 2 is not allowed to make an image printing to an L-size plain paper.

The current-set-value storage section 33 is to store a set value of each set item to be used in the absence of a print-setting instruction of an image for print when the printer 2 prints an image during direct printing, etc. The set value stored in the current-set-value storage section 33 is one combination of set values which is allowed for printing and stored in the combination-of-set-values storage section 32. Meanwhile, the current-set-value storage section 33 is in a default value or a value selected by the user through operating the input device 22 of the printer 2. In this embodiment, the current-set-value storage section 33 stores a set value of "A4-plain paper-one side with no frame", for example.

The rounded-set-value storage section 34 is to store a set-value combination for rounding a mismatch print setting into a set-value combination which is allowed for printing of the printer 2 in the case, when printing an image during direct printing or so, the print setting as to the printing is of a set-value combination which is not allowed for printing on the printer 2. The set-value combination stored in the rounded-set-value storage section 34 is one of set-value combinations which are allowed for printing on the printer 2 and stored in the combination-of-set-values storage section 32. Particularly, in this embodiment, the rounded-set-value storage section 34 stores a set-value combination of "L-size-photographic paper-one side with no frame", for example. The set-value combination "L-size-photographic paper-one side with no frame" is a set-value combination which is highly used and is most general set values in application in the direct printing system.

A communicating section 35 for the printer 2 is constituted by the USB communicating I/F 23, the USB_SIC communicating section 27 and the PTP communicating section 26 of the printer 2. The USB communicating I/F 23 of printer 2, when connected with the USB cable 4, functions as a USB host. Accordingly, in case the communicating section 35 of printer 2 and the communicating section 19 of DSC 1 are connected together by the USB cable 4, the communicating sections 19, 35 are allowed to communicate data with each other.

The print server section 25 is to be supplied with a print operation, etc. which the print client section 16 has sent to the printer 2. The print server section 25, when supplied with such a print operation, etc., executes a processing according to the operation thus supplied. For example, when supplied with a print operation, the print server section 25 supplies the supplied print operation to the print-operation saving section 28, to thereby notify a reception of print operation to the print-job generating section 29.

The print-operation saving section 28 is to store a print operation supplied to the print server section 25. The print operation includes a print-setting instruction generated at the DSC 1

The print-job generating section 29 is to generate a print setting by use of a print-setting instruction, etc. stored in the print-operation saving section 28, to generate a print job according to a generated print setting and an image of an image file selected by the DSC 1, thus supplying a generated print job to the print section 24.

The set-value mismatch deciding section 30 is to decide a mismatch as to a set value combination for use in printing. The set-value mismatch deciding section 30 operates as follows, for example. Namely, the set-value mismatch deciding section 30 displays on the liquid-crystal monitor 21 a set-value combination stored in the current-set value storage section 33. The set-value mismatch deciding section 30 in a state displaying a set value combination stored in the current-set value storage section 33, when inputted with a setting-change input instruction from the input device 22, refers to the item-based-set-value storage section 31 reads out all the set values of the set items including the set values related to the change, to display those on the liquid-crystal monitor 21. When inputted with an instruction for selecting one out of the set values being displayed from the input device 22, the set-value mismatch deciding section 30 refers to the combination-of-set-values storage section 32 and confirms whether or not the combination of the set values, whose set items have been replaced with the selected set values, is a combination of set values allowed for printing on the printer 2. In the case the combination of the replaced set values is a combination of set values allowed for printing on the printer 2, the set-value mismatch deciding section 30 causes the current-set value storage section 33 to store the combination of the replaced set values. Due to this, the user is allowed to store in the printer 2 a combination of set values he/she wishes to use on the printer 2. Incidentally, in the case that the combination of the replaced set values is not a combination of set values allowed for printing on the printer 2, the set-value mismatch deciding section 30 satisfactorily allows the user to again select a set value or suspends a set-value change process. Incidentally, when changing the set value at the present time, selectable set values may be displayed on the liquid-crystal monitor 21 by referring to the combination-of-set-values storage section 32 in place of displaying all the set values by a reference to the item-based-set-value storage section 31.

Now, explanation is made on the operation in direct printing of the direct print system of FIG. 1 having the above configuration.

FIG. 3 is a flowchart showing the overall processing flow of the DSC 1 and printer 2 in direct printing. The straight-lined boxes depicted beneath the characters "DSC (1)" represent the major processes that the DSC 1 is to execute in direct printing. The straight-lined boxes depicted beneath the characters "printer (21)" represent the major processes that the printer 2 is to execute in direct printing. The arrow lines between the two lines represent the major data to be exchanged between the DSC 1 and the printer 2 during direct printing.

In the case of performing a direct printing, the DSC 1 and the printer 2 are connected together by the USB cable 4, as shown in FIGS. 1 and 2 (step ST1). When the DSC 1 and the printer 2 are connected by the USB cable 4, predetermined communication is effected between the communicating section 19 of DSC 1 and the communicating section 35 of printer 2, thus bringing those into a state that data such as files and commands can be exchanged between those.

When the communicating sections 19, 35 becomes a state for data exchange, a discovery process is executed (step ST2). Specifically, the client section 16 of DSC 1 and the print server section 25 of printer 2 exchange predetermined files by use of the communicating sections 19, 35 thereof. By exchanging predetermined files mutually, the client section 16 of DSC 1 and the print server section 25 of printer 2 recognize that the opposite apparatuses of communication connected by the USB cable 4 are both apparatuses compatible with predetermined direct printing.

Thereafter, the client section 16 of DSC 1 starts an image select process. Incidentally, the print client section 16 satisfactorily starts an image select process according to a direct print start instruction of from the input device 12 or a fact of recognizing a connection of an apparatus corresponding to direct printing.

The print client section 16 first displays on the liquid-crystal monitor 11 an image of image file 15 stored in the semiconductor memory 14. The print client section 16 in a state displaying an image on the liquid-crystal monitor 11, when inputted a select instruction for selecting an image from the input device 12, selects the image file 15 of the image being displayed as an image to be printed (step ST3).

Selecting the image file of an image to be printed, the print client section 16 starts a print-set-instruction generating process. The print client section 16 first generates a request printer capability. The request printer capability is text data in a XML (eXtensible Markup Language) form, similarly to print operation, referred later. The request printer capability is an operation command for the printer 2 to acquire a set value based on a set item allowed for printing. For example, as for the request printer capability, paper size is designated as a set item. The communicating section 19 of DSC 1 sends the request printer capability generated by the print client section 16 to the communicating section 35 of printer 2 (step ST4). The communicating section 35 of printer 2 receives the request printer capability and supplies it to the printer server section 25.

The print server section 25 of printer 2, when supplied with the request printer capability, reads all the set values concerning the request out of the item-based-set-value storage section 31. Meanwhile, the print server section 25 generates a printer capability including a plurality of set values that all the set values read out are added with a set value for using a predetermined setting of the printer 2 (e.g. "printer standard setting"). For the printer capability, generated is a printer capability including four set values of "A4, L-size, A5, printer standard setting" as paper-size set values. The communicating section 35 of printer 2 sends the printer capability generated by the print server section 25 to the communicating section 19 of DSC 1 (step ST5). The communicating section 19 of DSC 1 receives the printer capability and supplies it to the print client section 16.

The print client section 16 of DSC 1, when supplied with the printer capability, displays on the liquid-crystal monitor 11 the set values included in the printer capability (step ST6). The print client section 16 displays on the liquid-crystal monitor 11 the set values included in the printer capability, in a state to be selected by using the input device 12.

FIG. 4 is a backside view showing a backside of the DSC 1 in FIG. 1. In the backside of DSC 1, there are arranged a liquid-crystal monitor 11 and a cross key 41 as one kind of input device 12. In the liquid-crystal monitor 11 of FIG. 4, a paper-size select screen is displayed as an example of display screen. Four displayed objects are arranged vertically in a line in the select screen. The displayed objects are assigned with characters corresponding to the respective set values included in the printer capability. Specifically, the uppermost displayed object is assigned with a character of set value "A4". The second upper displayed object is assigned with a character of set value "L-size". The third upper displayed object is assigned with a character of set value "A5". The fourth upper displayed object is assigned with a character of set value "printer standard setting".

Meanwhile, a displayed object in an arrow form is displayed on the select screen of FIG. 4, on the left of the set-value display objects in one row thereof. When the user operates the upper portion of the cross key 41, the arrow-formed displayed object moves upward within the display screen. When the user operates the lower portion of the cross key 41, the arrow-formed displayed object moves downward within the display screen. Due to this, the user is allowed to move the arrow-formed displayed object to the side of a desired one of displayed object assigned with a set value.

In case, for example, the user operates the right portion of the cross key 41 in a state the arrow-formed displayed object is positioned laterally of the desired set value of displayed object, the print client section 16 selects, as a set value for print-setting instruction, the set value of the set-value displayed object the arrow-formed displayed object is positioned laterally accoridng to a select instruction outputted by the input device 12 based on the operation thereof (step ST7). For example, when the right portion of the cross key 41 is operated in the state of display screen of FIG. 4, the print client section 16 selects "L-size" as a paper-size set value for a print-setting instruction.

When selecting the item-based set value for a print-setting instruction, the print client section 16 decides whether or not a print-set-instruction generation process is completed by the selection (step ST8). When the print-set-instruction generation process is not completed, the print client section 16 repeats the process of from a request printer capability transmission process as to a predetermined set item (step ST4) to a set-value select process based on display (step ST7).

The criterion as to the decision of whether or not a print-set-instruction generation process is completed is different depending upon the DSC 1. A certain DSC 1 is configured to set up a paper size at the DSC 1. In this case, the DSC 1 is to decide that the print-set-instruction generation process is completed, by a completion of paper size selection. Another DSC 1 is configured to set, at the DSC 1, a paper size and kind, an image print layout and print quality and an image correction process. In this case, the DSC 1 is to decide that the print-set-instruction generation process is completed by a completion of selecting five item-based set values.

Incidentally, in the explanation of FIG. 3 and the above, the print client section 16 of DSC 1 generates a request printer capability for each set item, and displays on the liquid-crystal monitor 11 set values of the set items as to the request obtained dependent thereupon, thus allowing the user to select a set value. Besides this, the print client section 16 for example generates a request printer capability as to all the set items to be set up, and displays on the liquid-crystal monitor 11 set values of set items concerning the request acquired dependent thereupon, thus allowing the user to select a set value.

Completing the print-set-instruction generation process, the print client section 16 generates a print operation (step ST9).

FIG. 5 is a figure showing an example of print operation 52 generated by the print client section 16 in FIG. 2. The print operation 52 is XML-formed text data. The print operation 52 has a tug representative of an XML version (<?xml version="1.0"?>) and a pair of tugs representing that the print operation 52 is a request (<Request>, </Request>). Between the one pair of tugs representative of requests, a pair of tugs are haven representing that the requests are requests for print job (<PrintJob>, </PrintJob>).

Between the one pair of tugs representative of print job requests, there is described a set value as to print-setting instruction sandwiched by a pair of tugs unique to each set item of the set value thereof. In the FIG. 5 print operation, print-quality set value "Best" is sandwiched by a pair of tugs (<PrintQuality>, </PrintQuality>) representative of print quality, paper-size set value "L" (L-size) is sandwiched by a pair of tugs (<PaperSize>, C/PaperSize>) representative of paper size, paper-type set value "Default" (meant to obey the current, predetermined setting of the printer) is sandwiched by a pair of tugs (<PaperType>, C/PaperType>) representative of paper type, image-file-15-type set value "Jpeg" is sandwiched by a pair of tugs (<FileType>, </FileType>) representative of image file 15 type, image-taking-date-printing set value "on" (meant to print) is sandwiched by a pair of tugs (<DatePrint>, </DatePrint>) representative of printing a image-taking-date, image-file-15 file-name-printing set value "off" (meant not to print) is sandwiched by a pair of tugs (<FileNamePrint>, </FileNamePrint>), image-processing-print-quality set value "Best" is sandwiched by a pair of tugs (<PrintQuality>, </PrintQuality>) representative of print quality, image-correction-process set value "on" is sandwiched by a pair of tugs (<ImageEnhancement>, </ImageEnhancement>) representative of image correction processing, number-of-copies set value "0030" (meant to print 30 copies) is sandwiched by a pair of tugs (<Copy>, </Copy>) representative of number-of-copies, image-file-15 ID (identification number generated corresponding one-to-one to image-file-15 name in the semiconductor memory 14) set value "00000001" is sandwiched by a pair of tugs (<ImageFileID>, </ImageFileID>) representative of a file ID of the image file 15, and date-of-print-set-instruction set value "2002/05/30" is sandwiched by a pair of tugs (<Date>, </Date>) representative of date of print-setting instruction.

In case the print client section 16 generates a print operation 52, the communicating section 19 of DSC 1 sends a generated print operation 52 to the communicating section 35 of printer 2 (step ST10). The communicating section 35 of printer 2 supplies the received print operation 52 to the print server section 25. The print server section 25 supplies the supplied print operation 52 to the print-operation saving section 28. The print-operation saving section 28 stores the supplied print operation 52 therein. Incidentally, the print-operation saving section 28, in print operation 52, satisfactorily stores at least the data sandwiched between a pair of tugs representative of a print job request.

When the print-operation saving section 28 stores the print operation 52, the print-job generating section 29 starts a print-job generation process (step ST11). In the print-job generation process, print setting is first generated.

Figure 6:
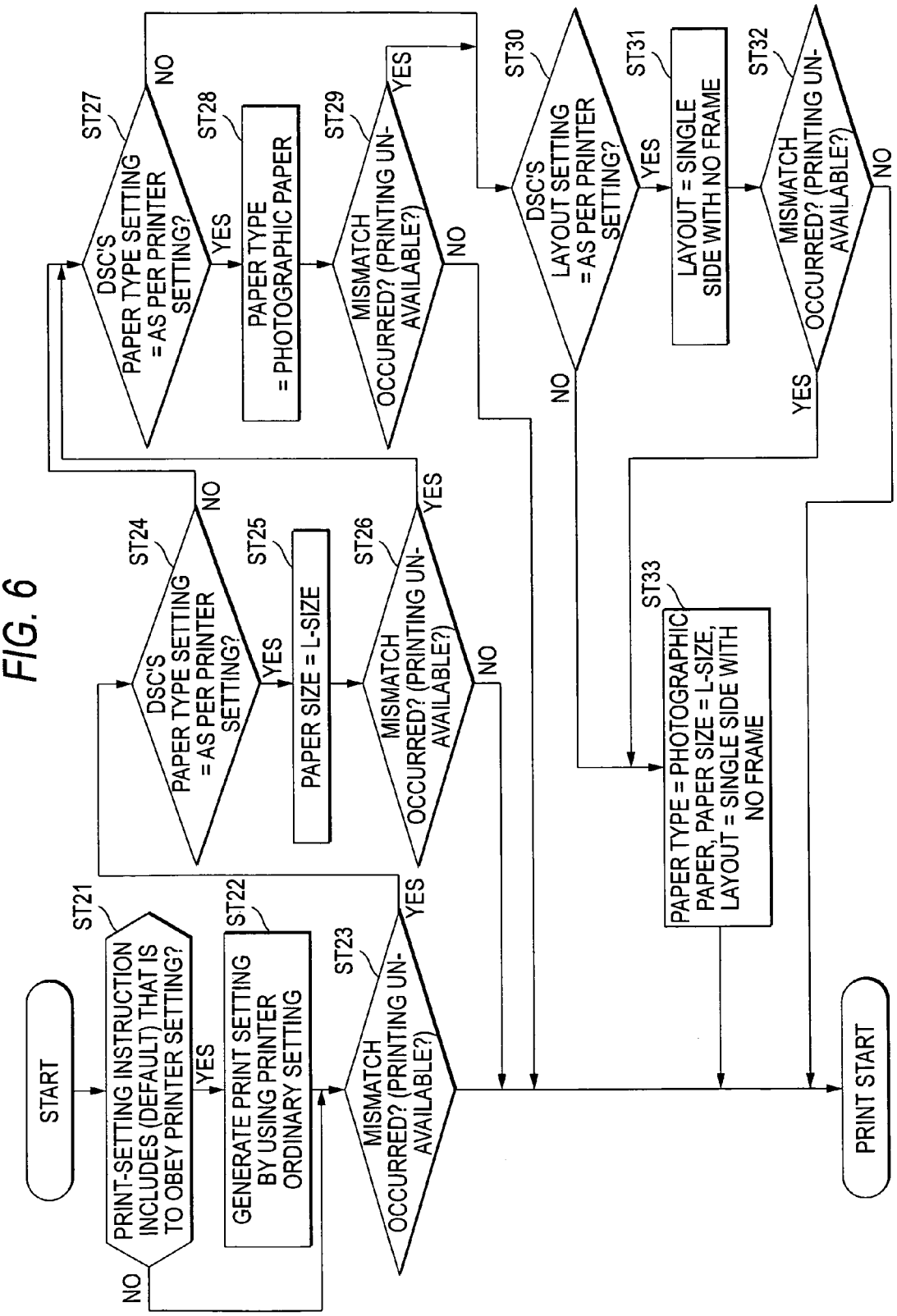
FIG. 6 is a flowchart of a print-setup generation process of a print-job generating section in FIG. 2.

FIG. 6 is a flowchart showing a print-setup generation process of the print-job generating section 29 in FIG. 2.

The print-job generating section 29, in a print-setup generation process, first reads a print-setting instruction generated at DSC 1 out of the print-operation saving section 28, and decides whether or not "Default" (obeying a predetermined setting currently of the printer) is included in the set value of the print-setting instruction. Meanwhile, the print-operation saving section 28 decides whether or not all the set values required for printing are included in the print-setting instruction (step ST21).

In the case "Default" is included in the set value of the print-setting instruction, the print-job generating section 29 reads a set value as set to printer 2 out of the current-set-value storage section 33, and replace the set value "Default" with the read set value. Meanwhile, in the case the print-setting instruction does not include a set value of set item required for printing, the print-job generating section 29 reads the set value of set item out of the current-set-value storage section 33 and adds the read set value as a set value of deficient item. For example, for a print-setting instruction with a designation of paper size and kind only, the print-job generating section 29 adds the print-layout set value stored in the current-set-value storage section 33 as to the set item of print layout (step ST22).

This generates a print setting including all the set values (excepting "Default") of set items required for printing.

FIG. 7 is an explanatory figure explaining an example of a set-value combining process to be executed by the print-job generating section of in FIG. 2.

FIG. 7(A) shows an example of a print-setting instruction to be set in the DSC 1. This one example of print-setting instruction as set at the DSC 1 includes the settings of "L-size" as a paper-size set value, "obeying printer setting (Default)" as a paper-type set value, and "single side with no frame" as a print-layout set value.

FIG. 7(B) shows an example of a set-value combination on printer 2 stored in the current-set-value storage section 33 of printer 2. This one example of print-setup combination stored in the current-set-value storage section 33 includes "A4" as a paper-size set value, "plain paper" as a paper-type set value, and "single side with no frame" as a print-layout set value.

FIG. 7(C) shows a combination of the print-setting instruction as set at the DSC 1 with the predetermined set value of FIG. 7(B) printer. This one example of combination includes "L-size4" as a paper-size set value, "plain paper" as a paper-type set value, and "single side with no frame" as a print-layout set value.

Generating a print setting by combining the set values stored in the current-set-value storage section 33, the print-job generating section 29 confirms whether or not the print setting is of a combination of set values allowed for printing on the printer 2 (step ST23). Specifically, the print-job generating section 29 causes the set-value mismatch deciding section 30 to decide whether or not there is a mismatch in the set-value combination for the print setting generated. The set-value mismatch deciding section 30 refers to the combination-of-set-values storage section 32 and decides whether or not the print setting generated by the print-job generating section 29 is to be allowed for printing on the printer 2.

In the case of the print setting example of FIG. 7(C), there is no L-size plain paper and hence the printer 2 is not set for printing to such a paper. Accordingly, the set-value mismatch deciding section 30 is to decide that the print setting generated by the print-job generating section 29 is not allowed for printing on the printer 2.

In the case the print setting generated by use of the set values in the current-set-value storage section 33 is not allowed for printing on the printer 2, the print-job generating section 29 starts a round process (steps ST24-ST33) in order to generate a print setting with which printing is allowed on the printer 2.

Specifically, the print-job generating section 29 first decides whether or not the received print-setting instruction stored in the print-operation saving section 28 has a paper-size set value "Default" (obeying a printer setting) (step ST24). In the case the received print-setting instruction has a paper-size set value "Default", the print-job generating section 29 generates a print setting that the paper-size set value is replaced with a paper-size set value (e.g. "L-size") stored in the set-value storage section 34 (step ST25). Thereafter, the print-job generating section 29 causes the set-value mismatch deciding section 30 to decide whether or not the generated print setting is a combination of set values allowed for printing on the printer 2 (step ST26).

In the case the received print-setting instruction has a paper-size set value of other than "Default" and in the case the replacement of the paper-size set value of the received print-setting instruction from "Default" to a rounding-off set value (e.g. "L-size") is not allowed for printing on the printer 2, the print-job generating section 29 then decides whether or not the received print-setting instruction stored in the print-operation saving section 28 has a paper-type set value of "Default" (obeying the printer setting) (step ST27). When the received print-setting instruction has a paper-type set value of "Default", the print-job generating section 29 generates a print setting that the paper-type set value is replaced with a paper-type set value (e.g. "photographic paper") stored in the rounded-set-value storage section 34 (step ST28). Thereafter, the print-job generating section 29 causes the set-value mismatch deciding section 30 to decide whether or not the generated print setting is a combination of set values with which the printer 2 can make a print (step ST29).

In the case the received print-setting instruction has a paper-size set value of other than "Default" and in the case the replacement of the paper-size set value of the received print-setting instruction from "Default" to a rounding-off set value (e.g. "photographic paper") is not allowed for printing on the printer 2, the print-job generating section 29 then decides whether or not the received print-setting instruction stored in the print-operation saving section 28 has a print-layout set value of "Default" (obeying the printer setting) (step ST30). When the received print-setting instruction has a print-layout set value of "Default", the print-job generating section 29 generates a print setting that the print-layout set value is replaced with a print-layout set value (e.g. "single side with no frame") stored in the rounded-set-value storage section 34 (step ST31). Thereafter, the print-job generating section 29 causes the set-value mismatch deciding section 30 to decide whether or not the generated print setting is a combination of set values with which the printer 2 can make a print (step ST32).

In the case the received print-setting instruction has a print-layout set value of other than "Default" and in the case the replacement of the print-layout set value of the received print-setting instruction from "Default" to a rounding-off set value (e.g. "single side with no frame") is not allowed for printing on the printer 2, the print-job generating section 29 then generates, as a print setting, a combination of set values (e.g. "L-size-photographic paper-single side with no frame") stored in the rounded-set-value storage section 34 (step ST33).

Incidentally, in the step of deciding whether or not a generated print setting is to be allowed for printing on the printer 2 (step ST23, ST26, ST29, ST32) in the FIG. 6 flowchart, when the generated print setting is to be allowed for printing on the printer 2, the rounding-off process is ended.

By completing the rounding-off process in the above, the print-job generating section 29, even when the print-setting instruction received from the DSC 1 is not allowed for printing as it is on the printer 2, generates a print setting allowed for printing on the printer 2.

In the case of the FIG. 7(A) print-setting instruction example, the paper-type is round to "photographic paper" by a paper-type rounding process. By the round print setting allowed for printing on the printer 2, the rounding-off process is completed. As a result, print setting is given by a paper-size set value of "L-size", a paper-type set value of "photographic paper" and a print-layout set value of "single side with no frame", as shown in FIG. 7(D).

Incidentally, in the rounding-off process in the FIG. 6 flowchart, only in the case the print-setting instruction has a set value of "Default" (obeying the printer setting), the steps ST24 to ST32 are executed in a manner rounding the set values. Besides this, in the case of adding a set value of deficient set item in the print-setting instruction, the added set value may be round. Meanwhile, the steps ST24 to ST32 may be executed in a manner rounding all the setup instructions. Besides, the steps ST24 to ST32 may be executed for all the set values of a print setting the print-job generating section 29 has generated at the step ST22.

After ending the print-setup generation process, the print-job generating section 29 generates a transmission request for an image file including a file ID stored in the print-operation saving section 28, as a second-stage process of the print-job generation process (step ST11 in FIG. 3). The communicating section 35 of printer 2 sends the transmission request for a generated image file to the communicating section 19 of DSC 1 (step ST12). The communicating section 19 of DSC 1 reads the corresponding image file 15 to the requested file ID out of the semiconductor memory 14 and sends it to the communicating section 35 of printer 2 (step ST13).

Then, the print-job generating section 29 generates a print job for printing the image of image file 15 according to a generated print setting, by use of the generated print setting and received image file 15. The print section 24 put ink to a paper rested in the paper tray 3, according to the print job generated by the print-job generating section 29, thus printing the image of image file 15 onto the paper (step ST14).

As described above, the direct print system of this embodiment can print on the printer 2 an image selected at the DSC 1, according to a print-setting instruction given at the DSC 1.

Moreover, the print-job generating section 29 of printer 2 does not change to a possible extent the set value (paper-size set value in FIG. 4) established at the DSC 1 by user's operation but rounds off the print setting by use of the set value stored in the rounded-set-value storage section 34 in the case, for example, the print-setting instruction sent from the DSC 1 is imperfect as a print setting or in the case the print setting the imperfect-print-setting instruction is complemented by the set value of printer 2. Due to this, the intension of the user operating the DSC 1 is reflected upon print conditions by the printer 2 set value. Meanwhile, the print section 24 of printer 2 is to make a printing based on the print setting that rounding-off is done to the print setting allowed for printing on the printer 2.

Accordingly, the direct print system of this embodiment is allowed for printing an image selected at the DSC 1 regardless of whether or not a plurality of set values included in a print operation of the image thereof are allowed for printing on the printer 2. As a result, without requiring a troublesome operation of the user who instructed for printing of an image by use of the DSC 1, the direct print system of this embodiment can make a printing of the image even in case the print-setting instruction by the user is not allowed for printing on the printer 2.

Meanwhile, in the direct print system of this embodiment, in the case a combination of a plurality of set values generated based on a print-setting instruction is a combination not allowed for printing on the printer 2, at least one of the plurality of set values generated is corrected to a set value highest in the market use ratio of direct printing and broadest in application. Accordingly, it is possible to round a plurality of set values into a plurality of set values higher in the possibility the user is to utilize. Moreover, because the set value not to be replaced uses a set value established at the DSC, it is possible to print a print-instructed image onto a paper while giving a serious consideration to the intent the user established for printing at the DSC 1.

Meanwhile, in the direct print system of this embodiment, the printer 2 is to use the paper size and type the user at the DSC 1 established for printing more preferentially than print layout and to use the paper size more preferentially than paper type. This allows the printer 2 to make a printing approximated to the settings the user intended upon setting up for printing by use of the DSC 1.

Meanwhile, in the direct print system of this embodiment, the paper size, paper type and print layout the user at the DSC established for printing is to be used more preferentially than the other set values. This allows for printing approximated to the intention the user made upon print setting up. Moreover, when replacing the other set values, paper size, paper type and print layout are already established. Depending upon a combination of paper size, paper type and print layout, the other set values can be changed to different values. As a result, the printer 2 can make an optimal printings while making use of the setting the user intended during the print setting using the DSC 1.

Although the embodiment is a preferred example of embodiment of the invention, the invention is not limited to this but can be changed and modified in various ways.

In the embodiment, the communicating section 19 of DSC 1 and the communicating section 35 of printer 2 utilize the configuration of the PTP communicating section 17, 26, the USB_SIC communicating section 18, 27 and the USB communicating I/F 13, 23. Besides this, the communicating section 19 of DSC 1 and the communicating section 35 of printer 2 may utilize a configuration of a USB mass storage class communicating section designating a SCSI command as a sub-class, and a USB communicating I/F.

In the embodiment, item-based-based set-values for the printer 2 are sent from the print server section 25 of printer 2 to the print client section 16 of DSC 1 so that the display objects of set values thus sent can be displayed for selection on the liquid-crystal monitor 11 of DSC 1. Besides this, for example, the print client section 16 of DSC 1 may selectably display on the liquid-crystal monitor 11 the display objects assigned with the set values previously stored in itself. In this modification, there is a possibility that the set values themselves the user is to select based on the displaying on the liquid-crystal monitor 11 are not set values allowed for printing on the printer 2. However, even in the event of occurrence of such a situation, i.e. even where such set values that the printer 2 is not compatible with be sent from the DSC 1 to the printer 2, the printer 2 utilizing the invention is allowed to round the setting into a predetermined rounding-off set value and thereby to make a printing.

In the embodiment, the print-job generating section 29 of printer 2, in the case, for example, the received print-setting instruction had a combination of set values not allowed for printing on the printer 2, the set-value combination of print-setting instruction was round into a set-value combination stored in the rounded-set-value storage section 34. Besides this, the print-job generating section 29, in the case, for example, the received print-setting instruction is not allowed for printing on the printer 2, the print-setting instruction may be round into a predetermined set-value combination as to the printer 2, a set-value combination high in user's use frequency, a set-value combination frequent for the user to utilize (namely, combination being utilized most frequent on the printer 2) or the like. Meanwhile, using the set-value mismatch deciding section 30, the set-value combination stored in the rounded-set-value storage section 34 may be updated by the user. Due to this, owing to the set-value combination established at the DSC 1 by the user, rounding off is possible to a set-value combination preferentially making use of a set-value combination the user previously established to the printer 2.

In the embodiment, the rounded-set-value storage section 34 stored one combination of set values. Besides this, the rounded-set-value storage section 34 may store a plurality of combinations of set values. The rounded-set-value storage section 34 may store combinations of set values to be round on a paper-size basis, for example. In the case the rounded-set-value-storage section 34 stores a plurality of combinations of set values in this manner, the print-job generating section 29 may select, for example, a combination most approximate to a combination of set values of the print-setting instruction received from the DSC 1 out of the rounded-set-value storage section 34, and perform a rounding process on the selected combination of set values.

In the embodiment, the print-job generating section 29 round the combination of set values in the order of paper size, paper type and print layout. Besides this, the print-job generating section 29 may round the set values in another order.

In the embodiment, the print-job generating section 29 referred to the rounded-set-value storage section 34 and round, for example, the set-value combination of a received print-setting instruction. Besides this, in the case of a printer 2 capable of deciding a size and type of the paper in the paper tray 3, the print-job generating section 29 may round the paper-size-and-type set values of a received print-setting instruction into a size and type of the paper set in the paper tray 3 thereof and the set values of other set items into a typical set value allowed for printing with the paper.

In the embodiment, the print-job generating section 29 round a combination of set values of paper size and type and print layout. Besides this, the print-job generating section 29 may round the set values of other set items than paper size and type and print layout. Such set items include image-quality set values (e.g. high quality, ordinary) and image correction (image optimization) set values (e.g. with correction, without correction).

The image-quality set values, etc. were optimized on each product of printer 2 in accordance with paper types and sizes. Namely, for example, for a certain printer, settings are done such that the image-quality set value is at ordinary for A4 plain paper and the image-quality set value is at high quality for L-size photographic paper. Meanwhile, as for image correction, optimization is done such that correction is to be made for an A4 plain paper while correction is not to be made for a A4 luster paper.

Accordingly, in the case of rounding the set values of other set items than paper size and type and print layout, the print-job generating section 29 preferably executes first a rounding process in two or more stages so as to make a rounding as to paper size and type and print layout and establishes these three set values and then makes a rounding of other set values than the three in two or more stages.

In the embodiment, the print-job generating section 29, in the case a print-setting instruction received or its interpolated print setting by means of set value for printer setting was not a combination of set values not allowed for printing on the printer 2, performed a rounding processing. Following the rounding process, the print section 24 was caused to make a print processing.

Besides this, the print-job generating section 29 may send a display message to the DSC 1 or display it on the printer 2 after a decision the print-setting instruction or print setting is not a combination of set values not allowed for printing on the printer 2 or a generation of round print settings. Furthermore, after approval of displayed message content, the process subsequent may be continued.

However, in the event of sudden display of a display message such as "print unavailable" on the DSC 1, some users possibly are not aware of how to cope therewith. Particularly, because the printer 2 has a low display ability by its liquid-crystal monitor 11, there is possibly a difficulty in displaying information for the user to fully understand the situation of printing. Accordingly, in the direct print system, it is preferred to make a configuration such that, when receiving a print operation 52, rounding process and print process are automatically executed subsequent thereto without displaying such a message, as in the embodiment.

The present invention can be utilized on a direct print system that, for example, a digital still camera and a printer are directly connected together so that the image selected on the digital still camera can be printed at the printer.

What is claimed is:

1. An image print apparatus comprising:
a receiver that receives a plurality of set values for printing an image on a paper;
storage which stores a combination of a plurality of set values according to which the image print apparatus can print;
setting storage which stores at least one set value currently set in the image print apparatus;
a generator that adds, when a number of the plurality of set values received by the receiver are smaller than that of a plurality of set values required for the image print apparatus to print, the set value stored in the setting storage to the plurality of set values received by the receiver, and that generates a print setting including a plurality of set values,
a deciding unit that decides whether or not the image print apparatus can print the image on the paper according to a combination of the plurality of set values included in the print setting generated by the generator by referring to the combination stored in the storage;
a correction unit that replaces, in a case the deciding unit decides that the image print apparatus cannot print the image on the paper according to the combination of the plurality of set values included in the print setting generated by the generator, at least one of the plurality of set values with another set value to generate the combination of the plurality of set values according to which the image print apparatus can print; and
a print unit that prints the image on the paper according to the combination of the plurality of set values generated by the correction unit.

2. The image print apparatus according to claim 1 wherein the plurality of set values received by the receiver are a print setting for printing an image on a paper or a print-setting instruction for instructing the printing.

3. The image print apparatus according to claim 2, wherein the receiver is connected to an image supply apparatus to receive the print-setting instruction together with a designation of an image selected for printing by the image supply apparatus.

4. The image print apparatus according to claim 1, wherein the combination of the plurality of set values generated by the correction unit is a combination of a plurality of set values which is most general set values in a direct print system.

5. The image print apparatus according to claim 1, wherein
the deciding unit makes a decision as to the plurality of set values including at least paper size, paper type and print layout,
the correction unit decides a necessity of replacing the respective set values in an order of paper size, paper type and print layout, and replaces a set value required for replacement.

6. The image print apparatus according to claim 1, wherein the correction unit decides a necessity of replacing the set values including paper size, paper type and print layout, and replaces a set value required for replacement, and thereafter replaces a set value as to image quality and/or image correction.

7. A direct print system comprising:
an image supply apparatus for sending a print-setting instruction together with a designation of a selected image to the image print apparatus;
an image print apparatus according to any one of claims 1 and 2-6 which receives the print-setting instruction including the plurality of set values, and prints the image based on the plurality of set values included in the received print-setting instruction in a case the image print apparatus can print the image according to a combination of the plurality of set values of the print-setting instruction.

8. A method of making a print setting of an image print apparatus, the method comprising:
receiving a plurality of set values for printing an image on a paper;
storing a combination of a plurality of set values according to which the image print apparatus can print;
storing at least one set value currently set in the image print apparatus;
when a number of the plurality of set values received is smaller than a plurality of set values required for the image print apparatus to print, adding the stored set value currently set in the image print apparatus to the received plurality of set values to generate a print setting including a plurality of set values;
deciding whether or not the image print apparatus can print the image on the paper according to combination of the plurality of set values included in the generated print setting by referring to the stored combination of the plurality of set values according to which the image print apparatus can print; and
replacing, in a case it is decided that the image print apparatus cannot print the image on the paper according to the combination of the plurality of set values included in the generated print setting, at least one of the plurality of set values with another set value to generate the combination of the plurality of set values according to which the image print apparatus can print.

* * * * *